United States Patent
Kühl et al.

(10) Patent No.: US 7,974,260 B2
(45) Date of Patent: Jul. 5, 2011

(54) METHOD OF TRANSMITTING TIME-CRITICAL SCHEDULING INFORMATION BETWEEN SINGLE NETWORK DEVICES IN A WIRELESS NETWORK USING SLOTTED POINT-TO-POINT LINKS

(75) Inventors: Carmen Kühl, Dortmund (DE); Simon Baatz, Bonn (DE); Christoph Scholz, Bonn (DE)

(73) Assignee: Spyder Navigations L.L.C., Wilmington, DE (US)

( * ) Notice: Subject to any disclaimer, the term of this patent is extended or adjusted under 35 U.S.C. 154(b) by 1427 days.

(21) Appl. No.: 10/489,269

(22) PCT Filed: Sep. 10, 2001

(86) PCT No.: PCT/EP01/10452
§ 371 (c)(1),
(2), (4) Date: Sep. 29, 2004

(87) PCT Pub. No.: WO03/024031
PCT Pub. Date: Mar. 20, 2003

(65) Prior Publication Data
US 2005/0041613 A1 Feb. 24, 2005

(51) Int. Cl.
*H04B 7/212* (2006.01)
(52) U.S. Cl. ........................................ 370/348
(58) Field of Classification Search .................. 370/330, 370/347, 389, 395.53, 421, 487, 526, 338, 370/394, 470–480; 375/132, 133, 322; 709/235
See application file for complete search history.

(56) References Cited

U.S. PATENT DOCUMENTS

| 5,008,883 | A |   | 4/1991 | Eizenhofer et al. |
| 5,442,659 | A | * | 8/1995 | Bauchot et al. ................ 375/134 |
| 5,537,414 | A | * | 7/1996 | Takiyasu et al. ............... 370/347 |
| 5,594,738 | A |   | 1/1997 | Crisler et al. |
| 5,790,806 | A | * | 8/1998 | Koperda ........................ 709/252 |
| 5,901,363 | A |   | 5/1999 | Töyrylä |
| 5,912,918 | A | * | 6/1999 | Bauchot et al. ................ 375/133 |
| 5,982,783 | A | * | 11/1999 | Frey et al. ................... 370/395.6 |
| 5,987,024 | A | * | 11/1999 | Duch et al. ..................... 370/350 |
| 5,991,308 | A | * | 11/1999 | Fuhrmann et al. ........ 370/395.53 |
| 5,999,980 | A | * | 12/1999 | Tanaka et al. .................. 709/235 |
| 6,031,864 | A | * | 2/2000 | Bauchot et al. ................ 375/133 |
| 6,097,703 | A |   | 8/2000 | Larsen et al. |
| 6,122,527 | A | * | 9/2000 | Robinson et al. .............. 455/557 |
| 6,130,894 | A | * | 10/2000 | Ojard et al. .................... 370/421 |

(Continued)

FOREIGN PATENT DOCUMENTS

EP 1107516 A1 6/2001

(Continued)

OTHER PUBLICATIONS

M. Kalia, et al.; Data Scheduling and SAR for Bluetooth MAC; IEEE VTC 2000 Conference Proceedings, pp. 716-720, May 2000.

(Continued)

*Primary Examiner* — Anh-Vu Ly
*Assistant Examiner* — Robert Root

(57) ABSTRACT

Timing control information, especially scheduling information, is transmitted between single network devices in a wireless network. Timing control information is usually time-critical information since communication parameters may be changing rapidly in wireless networks. The invention provides a method to transmit the time-critical and up-to-date timing control information to a recipient just-in-time.

29 Claims, 3 Drawing Sheets

Each device stores the state of each of its communication links

U.S. PATENT DOCUMENTS

| | | | |
|---|---|---|---|
| 6,266,350 B1 * | 7/2001 | Ojard et al. | 370/526 |
| 6,366,622 B1 * | 4/2002 | Brown et al. | 375/322 |
| 6,480,505 B1 | 11/2002 | Johansson et al. | |
| 6,731,602 B1 * | 5/2004 | Watanabe et al. | 370/231 |
| 6,738,437 B2 * | 5/2004 | Chi et al. | 375/343 |
| 6,928,085 B2 | 8/2005 | Haartsen | |
| 6,944,148 B1 | 9/2005 | Gehring et al. | |
| 6,963,534 B1 | 11/2005 | Shorey et al. | |
| 6,965,601 B1 * | 11/2005 | Nakano et al. | 370/394 |
| 6,975,613 B1 | 12/2005 | Johansson | |
| 7,016,372 B2 | 3/2006 | Haartsen | |
| 7,058,050 B2 | 6/2006 | Johansson et al. | |
| 2001/0002912 A1 * | 6/2001 | Tony et al. | 370/487 |
| 2001/0029166 A1 * | 10/2001 | Rune et al. | 455/41 |
| 2002/0012329 A1 * | 1/2002 | Atkinson et al. | 370/330 |
| 2002/0071477 A1 * | 6/2002 | Orava | 375/132 |
| 2002/0075941 A1 * | 6/2002 | Souissi et al. | 375/133 |
| 2002/0150075 A1 | 10/2002 | Belcea | |
| 2002/0150145 A1 * | 10/2002 | Alriksson et al. | 375/132 |
| 2002/0151275 A1 * | 10/2002 | Trost et al. | 455/41 |
| 2002/0159418 A1 | 10/2002 | Rudnick et al. | |
| 2002/0176412 A1 * | 11/2002 | Racz et al. | 370/389 |
| 2003/0016770 A1 * | 1/2003 | Trans et al. | 375/346 |
| 2003/0037033 A1 * | 2/2003 | Nyman et al. | 707/1 |
| 2005/0239474 A9 | 10/2005 | Liang | |

FOREIGN PATENT DOCUMENTS

| | | |
|---|---|---|
| WO | WO 99/14898 | 3/1999 |
| WO | WO 01/30031 | 4/2001 |
| WO | WO 01/41348 A2 | 6/2001 |
| WO | WO 01/97458 | 12/2001 |

OTHER PUBLICATIONS

S. Garg, et al.; MAC Scheduling Policies for Power Optimization in Bluetooth; A Master Driven TDD Wireless System; IEEE VTC 2000 Conference Proceedings, pp. 196-2000, May 2000.

M. Kalia, et al.: MAC Scheduling and SAR polices for Bluetooth: A Master Driven TDD Pico-Cellular Wireless System: International Workshop on Mobile Multimedia Communications, Nov. 1999; pp. 384-388.

International Search Report for PCT/EP01/10452 mailed on Aug. 2, 2002.

European Search Report for EP 01 10 8032 dated Nov. 27, 2001.

The International Search Report for PCT/IB2002/00981 mailed on Jul. 8, 2002.

The International Preliminary Examination Report for PCT/IB2002/00981 completed on May 28, 2003.

The International Search Report for PCT/EP2001/010452 mailed on Aug. 2, 2002.

The International Preliminary Examination Report for PCT/EP2001/010452 completed on Nov. 24, 2003.

The European Search Report for application No. EP 01 108 032 completed on Nov. 9, 2001.

The Communication for EP application No. 02 718 431 dated Apr. 2, 2007.

The Communication for EP application No. 01 972 040 dated on Oct. 5, 2004.

The Communication for EP application No. 01 972 040 dated on May 31, 2005.

The Communication for EP application No. 01 972 040 dated on Dec. 1, 2005.

* cited by examiner

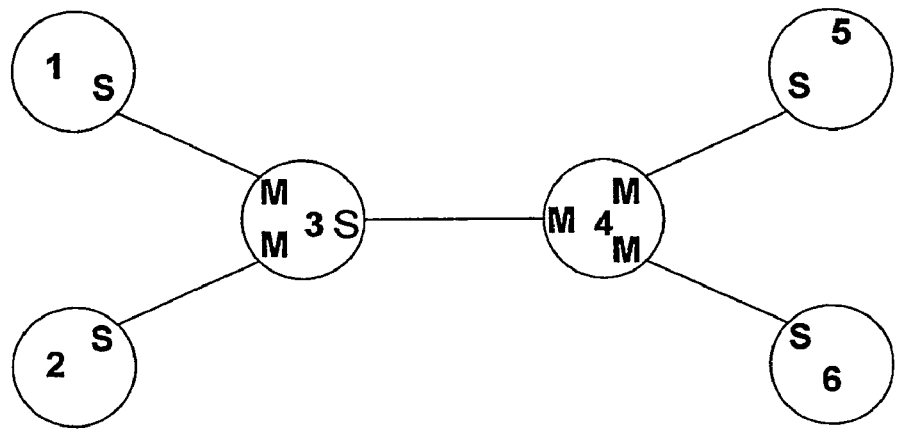
Figure 4: Example topology with 6 devices and 5 connections
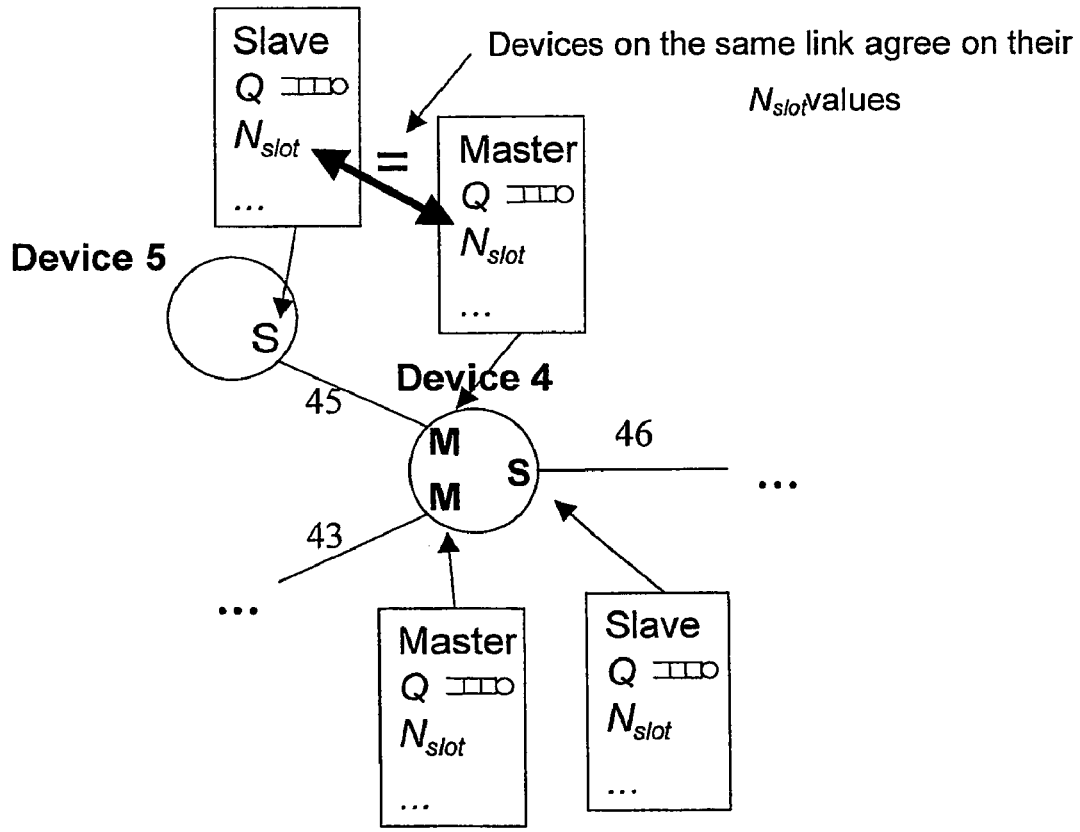
Figure 5: Each device stores the state of each of its communication links

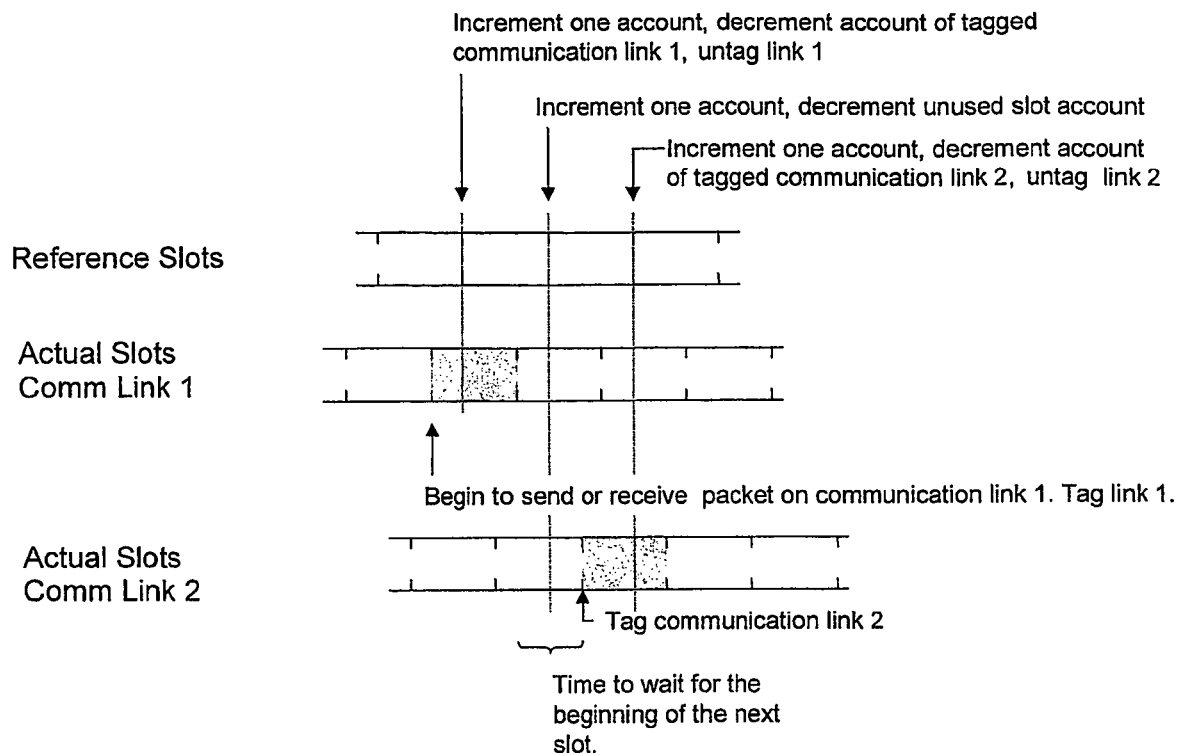
Figure 6: Slot accounting with differing slot timings
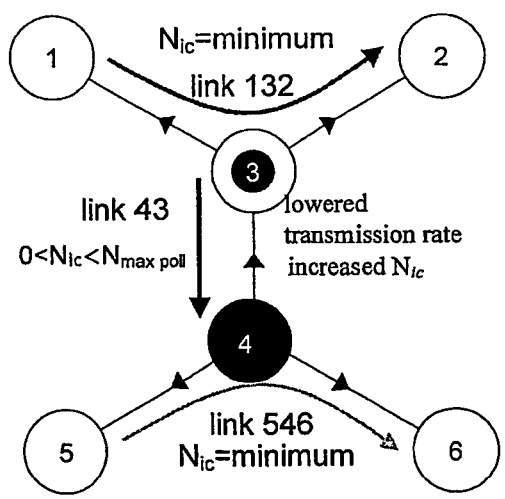
Figure 7: Scenario that demonstrates the dynamic adaptation of $N_{inteslot}$ distribution

METHOD OF TRANSMITTING TIME-CRITICAL SCHEDULING INFORMATION BETWEEN SINGLE NETWORK DEVICES IN A WIRELESS NETWORK USING SLOTTED POINT-TO-POINT LINKS

CROSS REFERENCE TO RELATED APPLICATION

This application is the U.S. National Stage of International Application PCT/EP01/10452 filed Sep. 10, 2001 and published in English on Mar. 20, 2003 under International Publication Number WO 03/024031 A1.

BACKGROUND OF THE INVENTION

Technical Field

The present invention relates to networks, especially wireless networks communicating between single devices. In particular the present invention relates to network topologies where devices communicate over slotted point-to-point links. More particularly the present invention relates to networks where non-centralized scheduling algorithms are executed on each network device independently and time-critical scheduling information has to be exchanged between the protocol layers or algorithms of the network devices.

Conventional networks, for example a network of microprocessor controlled devices such as computer, printers, modems etc. have relied upon physical wire connections between the devices in the network. Due to the physical nature of the connection required, conventional networks are generally perceived to be fairly rigid in nature. For example, in order to add an additional device into the network, the additional device must be physically connected to the network, and the network server may have to be informed that the additional device has been connected.

Recently however, wireless networks have emerged in which the network connections are provided typically by a wireless radio link. One of these networks is described in the various Bluetooth™ standards (see e.g. http://www.bluetooth.com). Those skilled in the art will appreciate that other wireless networks also exist, and reference herein to the Bluetooth standards is not intended to be limited hereto.

Bluetooth wireless technology allows users to make effortless, wireless and instant connections between various communication devices, such as mobile phones, computers, printers etc. Bluetooth technology provides for a short-range wireless connectivity and supports both point-to-point and point-to-multipoint connections. Currently, up to seven active 'slave' devices can communicate with a 'master' device, to form a 'piconet'. Several of these 'piconets' can be established and linked together in ad hoc 'scatternets', to allow communication among continually flexible configurations.

Due to the wireless nature of the piconet and the scatternet, and to minimize the expense, most of the wireless network devices comprise only one data-transceiver. Therefore the network devices are only capable of communicating with one other network device at a time. Within a piconet with only one master and up to 7 active slaves no special scheduling process has to be used to execute a nearly optimized data transfer. This is due to the fact that the master usually is the device having most computing power, and the slaves usually are peripheral applications for the master device. In this topology the overall communication performance is optimized, when the communication of the master is optimized. At the level of scatternets, the overall communication performance depends on other parameters. In a scatternet one network device is not fixed with its role to be master or slave, but can be master to some of its links and simultaneously be slave to some other of its links. Therefore an arbitrary or even distribution of priorities or transmission times can always be expected to be suboptimal.

Prior solutions concerning connections between piconets, such as WO 99/14898 regarding 'Contemporaneous connectivity to multiple piconets' have been based on the utilization of specified Bluetooth low-power modes and negotiated time periods and were therefore bound to act within certain corresponding limits, e.g. communication overhead resulting from parameter negotiation. In addition, a periodic behaviour was assumed, thereby restricting the adaptation to varying traffic loads and topologies to a minimum. Moreover, prior solutions concerning piconets provide no method to transmit time-critical scheduling information between the independent piconet devices.

Furthermore, several additional transmission modes can be used within piconets to enable communication between the network devices of a piconet. The modes distinguish in the kind of connection state, i.e. the connection link between the network devices of the piconet is established and the data exchange through the connection links can be performed. For example, employing on Bluetooth networks the slots are assigned in number by a master network device to its connected slave network devices according to the demands of data packet throughput of the connection links thereof. The number of assigned slots between the master network device and a slave network device is negotiated. According to the kind of network device and its activity or data generation, respectively, different connection states are available in order to assign an appropriate number of slots to the respective communication links. The connection states differ in the assignment of allocated transmission slots of the wireless network and are negotiated between the link managers included in the network devices using certain information packets containing control massages that characterize among other things the communication links.

In a connection state, called active mode, a master schedules the transmission based on traffic demands to and from the different slaves. The slaves listen to each master-to-slave transmission slot for incoming data sequences or packets, respectively. The master can assign a certain number of slots for data communication to an addressed slave by a type indication contained in the data packets; non addressed slaves may sleep during communication between master and addressed slave.

In a further connection state, called sniff mode, listen activity of the slave can be reduced, and that means that the slots for master-to-slave transmission for incoming packets—those to which a slave device must listen—are reduced. These specified slots are regularly spaced and negotiated between master and slave before the slave enters the sniff mode. The sniff mode reduces the duty cycles of the slave i.e. the slave listens only to a reduced number of master-to-slave transmission slots. The sniff mode is introduced to handle slaves with lower transmission activity accordingly in order to increase the transmission bandwidth for other network devices requiring higher transmission bandwidth, and in order to enable battery-powered devices to decrease their power consumption. Correspondingly, the master can start transmitting data packets to a certain slave only in the specified time slots for master-to-slave transmission called sniff slots that are prenegotiated between master and slave. During periods of inactivity of the slave in sniff mode the master will not transmit data packets to the slave.

The parameters defining the connection modes and/or the assignment of slot distribution by operating scatternet arrangements over network devices may be summarized as timing control information or scheduling information of the network devices, respectively. Additional parameters concerning the timing control may be also included in this term.

DISCLOSURE OF INVENTION

In accordance with the invention, a method is provided which enables the transmission of time-critical timing control information within a wireless network, especially wireless radio frequency networks, using slotted communication links between single network devices to transmit data sequences. Slotted communication links may be used in wireless radio frequency networks using time division duplex (TDD) transfer mode. A data sequence containing time-critical timing control information is provided which is defined by a header portion and a payload portion. The header portion contains at least an address code but may also contain additional code like code to indicate special contents or to indicate a special transmitting mode. Further it may be possible that the header portion contains code to signalize special treatment of the data sequence. The payload portion of the data sequence contains exclusively the time-critical timing control information. To transmit the time-critical timing control information a specified channel in accordance with the contents is used.

Advantageously, the specified channel may be independent of the channels provided by the wireless network for transmitting the device generated data sequences or packets, respectively. A specified channel enables the transmission of the time-critical timing control information in time even if the transmission channels of the wireless network are occupied by the network devices for packet transmission. Therefore, a network load independent specified channel increases the transmission speed of the time-critical timing control information and ensures a just-in-time reception by the corresponding network device.

Time-critical timing control information may concern the prioritizing of network communication links, the network transmission rate, the network error handling, the communication link distribution and related timing control properties.

Networks using slotted communication links assign a defined number of slots to each connected network device for data transmission. It may be assumed that a master device assigns the available slots for communication links to a certain connected number of slave devices. Prioritizing of communication links means that the number of slots assigned to each slave device is not equally distributed since the network load of certain data links to certain slave devices may require a higher data rate. A higher number of slots may be assigned to the respective devices causing high packet transmission rates. A prioritizing of network links offers the possibility to prefer certain communication links and therefore prefer certain network devices. The distribution of slots to communication links may be a time-critical timing control information for participating network devices or indirectly affected network devices.

Network transmission rates may be also a time-critical timing control information since certain network devices may generate time-critical data packets which have to be routed through the wireless network using point-to-point communication links. The usage of point-to-point communication links may affect several network devices since the generated data packets may have to be routed through these network devices in order to be received by the addressed network device.

Error handling especially of wireless networks is important in order to provide communication links with high data rates and reliable communication. This affects directly the quality of service provided by the network. Parameters concerning the quality of service like error handling are often time-critical timing control information for single network devices since quality of the communication links may be changing rapidly.

It may be noted that timing control information also comprises scheduling information of the network devices. In case of managing a wireless radio frequency network timing control information is of special interest since the number of channels for transmitting data is limited and the transmission of network devices has to be controlled to avoid simultaneous transmission of data. Simultaneous transmission of network devices may cause transmission collisions and reduces the capability of data transmission rate of the network.

Accordingly, the method according to the present invention enables transmittal of time-critical timing control information by providing a suitably adapted and often crucial fast transmission method.

Wireless networks may provide logical communication channels and data sequences reserved for transmitting timing control information in order to handle the above described information. These logical communication channels and data sequences may not be intended for transmitting time-critical timing control information but only may be optimized for transmission of this information. Advantageously, time-critical timing control information may be no more up-to-date if methods for reliable communication are involved. Especially, in cases involving automatic repeat request (ARQ) methods it may lead to the usage of non timing control information and therefore may disturb the communication of the whole network. Because of that the usage of standard data packets as used for transmitting network device packet data may be advantageous and offers the possibility to use up-to-date time-critical timing control information.

Preferably, the address code contained in the header portion codes a dedicated address of a network device. Each network device can be addressed for transmitting data packets by a unique address code wherein the address of the network device has to be at least unambiguous over the local communicating network. In order to ensure the transmission of the time-critical control information to a certain network device this certain device may have assigned a second dedicated or virtual device address, respectively. This dedicated network address causes the establishment of a separate network link independently from existing network communication links. Moreover, the separate network communication link or quasi-separate logical channel can be used for transmitting data packets independently from the current used network links and consequently, the transmission of data packets through the separate network link is unaffected of network load caused by the established network links. Therefore, time-critical timing control information may be transmitted in a reliable way according to the importance of the timing control information.

Advantageously, the network device may recognize the timing control information containing the data sequence from data sequences containing regular device data by the usage of the dedicated active member address and uses accordingly the timing control information.

Further preferably, the header portion of the data sequence containing the schedule information may contain an additional separate code sequence that may indicate a specific content or a specific treatment, especially with respect to transmission handling and likely coded information. Preferably, the header portion may contain a code sequence indicating that the payload contains exclusively time-critical timing control information. According to this indicating sequence code of the header portion a quasi-separate channel may be established to transmit the corresponding data sequence to the addressed network device. The established quasi-separate channel may guarantee the transmission of the time-critical timing control information. It may also be possible to transmit the indicated data sequence using the corresponding established existing network communication link used for data packet transmission. The addressed network device may distinguish the timing control information containing data sequence from the standard data packets by analyzing the separate code sequence of the header portion. In case of recognition of the indicating sequence the timing control information may be used accordingly by the addressed network device.

Conveniently, time-critical timing control information may be important to control the network communication links established in a scatternet. The linking of several piconets, i.e. a wireless network consisting of a master device and several slave devices, wherein the communication links are controlled by the master device, forming a scatternet involves an increasing expenditure of management in order to provide reliable network communication links. Therefore, time-critical timing control information may have to be transmitted to the several network devices to establish communication links according to the network load caused by the network devices. The grouping of the network devices to master controlled piconets and the linking of this piconets to a scatternet wherein the network devices may communicate to each other using communication links through several network devices may lighten the difficulty and the circumstances of managing such communication networks.

The time-critical timing control information may be transmitted using a dedicated or virtual network address, respectively, only in case of an established scatternet. In case of no established scatternet the separate network link due to the dedicated network address is not established.

If a network device receives a data packet containing timing control information the network device uses timing control information only in case of an established scatternet. The data packets have additionally a signalling code sequence contained in the header portion. The signalling code sequence enables the differentiation of normal data packets containing device data and data packets containing timing control information by a network device.

Advantageously, time-critical timing control information may be important to control the network communication links established in a network using prioritized usage of slotted communication links by a single network device. Prioritizing of networks is used to offer network communication links for network devices causing different network load. Network devices may generate a different amount of data. An equal priority of these network devices may not offer the possibility to use the data packet rate as high as possible as the data packet rate is equally distributed over the network devices also if some or several network devices do not use the possibility of transmission.

More advantageously, the usage of a prioritized network provides a method to the single network devices in a wireless network to prioritize the usage of slotted links for adapting to varying traffic loads, comprising the steps of: pre-setting a distribution of priorities for using a link to predetermined values, monitoring the current link usage, and adapting the priorities in accordance with the monitored usage. By pre-setting the distribution of priorities an even distribution of the priorities among the links to use the links can be chosen. In a further developed network, devices may store an average priority distribution of previously averaged values obtained during a prior time interval to start with a pre-optimized priority distribution. By monitoring the current link usage, the network devices can detect by themselves if the current priority distribution is optimal or not. By adapting the priorities in accordance with the monitored usage, the network device can self-adapt and optimize the local communication performance. According to the algorithm used to adapt and optimize the local communication performance of the network devices the exchange of timing control information may be important and especially, if the algorithm reacts fast on changing network load caused by the network devices the transmission of the timing control information is time-critical.

Conveniently, slotted links usually transmit data in packets, each fitting into a slot or a number of slots. At least three different types of packets have to be distinguished. First, there is an ordinary data packet that may carry additional control information. Secondly, there is a dataless so-called NULL packet that is sent by a device that has no data to send. Thirdly, there is a so-called ABORT packet that does not carry any data but provides a boolean flag (redistribute flag). The ABORT packet may be used at the end of contacts. The ABORT packet can be used to adapt the priorities of the single links or network devices.

Preferably, the priority is divided into different levels of priority. By different levels of priority the different aspects of the communication can be considered to use different optimization strategies to adapt to different network situations.

Advantageously, a first level of priority distinguishes between master and slave. A binary version of the master/slave concept may be sufficient for substantially linear network structures in which for example the main transmission direction may be inverted globally. In flexible network topologies with interconnection in which a single network device can be connected to more than one master, a binary master/slave concept is insufficient. In interconnected network structures a graduated master/slave concept can be applied, in which a slave can refuse an order from a master if he is occupied with an order from another higher-ranking master. In a network of point-to-point links the single network devices have to agree about the values of master/slave at each end of a link. This concept may relate to a local master/slave definition or to a global master/slave definition. A global master/slave definition can prevent situations in which a slave device cannot decide which order is to be followed. A local master/slave definition enables the network to react flexibly to different network conditions, such as a change in the topology.

Conveniently, a level of priority relates to the priority to use a link. By a graduated priority to use a link, the binary master/slave concept can be extended to a graduated master/slave concept. In the case of point-to-point links the authority to use a link is equivalent to a priority higher than the network device on the other end of the link.

Preferably, a third level of priority relates to the distribution of communication time between said devices. By a priority that is related to the communication time between the devices, an additional parameter can be introduced to enhance the optimization of the communication between the single network devices. In a time division duplex (TDD) transfer mode, the other transfer parameter such as bandwidth or transfer rate are usually unchanged. In other transfer modes, other transfer parameter such as bandwidth, modulation and the like can be changed, too. In a communication link using a slotted communication scheme, the slot length can be changed.

The communication time can be defined as the number of slots that can be used in sequence. In a network using a slotted communication scheme with fixed length slots the variable communication time can only be changed in discrete steps of multiples of one slot length. The communication time can be scheduled in the value of a slot account s which defines the number of slots a terminal device can use in sequence.

Conveniently, communications between two devices of the network can only be started at a contact slot. By using contact slots single master/slave device pairs define a time in which a contact can be started. The master of a communication link is free to address the slave device in a contact slot by sending a data or control packet. The slave may listen to the packet beginning in this slot and respond by sending a packet. If it does so, a contact event starts. If only one of the devices tried to use a specific contact slot, the device performed an unsuccessful contact attempt. A device that does not use a contact slot in order to establish a contact event is free to use this slot for any other purpose, e.g. another contact event or a contact slot of another communication link. Basically, every contact slot can be used to start a contact event. Nevertheless, it is sometimes necessary and also reasonable to skip certain contact slots in order to continue the current contact event. Therefore, the contact slots comprise one parameter that determines a priority of the upcoming contact slot called slot account. There are two cases that have to be distinguished when considering the use of contact slots.

If there is no current active contact event in which the device is participating, any upcoming contact slot will be available for use. If there is a current contact event, an upcoming contact slot of a communication link other than the current one may trigger an interruption of the current contact event. In order to do so, the new communication link's slot account $s_{new}$ must exceed the current communication link's slot account $s_{current}$ by a certain threshold. This threshold may be defined as the maximum of the min_serve values of the old and the current communication link. Thus, the following equation must hold:

$$s_{new} - s_{current} \geq \max(\text{min\_serve}_{current}, \text{min\_serve}_{new}).$$

It may happen that several contact slots of different communication links appear simultaneously. In this case, a priority scheme has to be devised that determines which communication link's contact slot to select for use.

Preferably, a repetition rate of contact slots is related to the monitored link usage. It may happen that a contact event ends immediately after a successful contact attempt because both devices do not have any data to send. As the two slots used for the contact attempt are effectively lost, it may be desirable to minimize the occurrence of this kind of event. Additionally, keeping the number of unsuccessful contact attempts low is crucial, because otherwise contact events are aborted needlessly.

Thus, it may be preferable to reduce the number of contact attempts on such communication links. To do so, a backoff counter is kept per communication link. This counter is increased and decreased at certain events. Higher values of the backoff counter mean that contact slots happen less frequently. Note that the backoff counter is only valid for a communication link whose slot number value has not exceeded a predetermined value for the last contact by the value of a maximum poll. If a device performed an unsuccessful contact event for a communication link, a backoff counter of this communication link should be increased.

Advantageously, one level of priority is related to the time passed since the last successful contact. The priority of a link between two devices can be increased with the time passed since the last contact. This adapts the time passed since the last contact to the priority to account for disadvantages of a low contact frequency with a high priority. To prevent a single device from leaving the network unnoticed, or to prevent a single network device accumulating too much data, predetermined time intervals are agreed upon after which the priority of a contact slot is set to a maximum or at least increased. This prevents the backoff counter from 'winding up' which means that the distance between two contact slots gets noticable by a network user. Therefore a current contact event may also be aborted by the use of a contact slot of a communication link, whose slot number value exceeds a predetermined value for the last contact by the value of the maximum poll. In a final step, the device that aborts the current contact event to use an upcoming contact slot may inform the current peer device by sending an ABORT packet with the appropriate value of the redistribute flag (FALSE, if slot number of the new communication link exceeded the maximum poll value. TRUE, otherwise).

Conveniently, communication related data is transferred from one device to another. When using a frequency hopping transmission algorithm this can be the hop sequence or the kind of data which is used for its calculation. The communication related data can be related to required transmission power, e.g. a power-save mode for the transmission devices used in the radio connection. The communication related data can comprise data about the transfer rate. Even information about the expected remaining operation time for fully mobile terminal devices such as mobile computers or the like may be included. The information can comprise the expected length of the next transmission or the expected priorities of the next transmission, or even the expected time of the next transmission having a higher priority.

Preferably the method of prioritizing further comprises the optional step of interrupting a transmission, especially of lower priority. Especially in data transmission networks, a priority comprises in a first level the priority to access a data transmission link after the termination of a current transmission. A second level of priority can allow a device to interrupt a current transmission of lower priority. It is for example conceivable for a master to cope with the situation in which a slave does not respond to polls, which can easily happen in a wireless network e.g. due to location changes of slave devices. Therefore, the master device needs an algorithm to add or delete other slave or master devices to or from the present links. To prevent a single device from being deleted from the present link, and later having to be re-added after a certain period, the priority can be related to the time passed since the last contact. Therefore, if a single slave device is to be deleted during a current transmission, the priority of the device should be set to a maximum to interrupt the current transmission, contact the master device and prevent deletion from the link, in order to avoid time consuming re-adding procedures.

An abortion of a transmission is useful in the case of e.g. a linear tree device sub-network, wherein a first device is slave to a second device which is at the same time slave to a third device. In this sub-net structure the third device may not access the second device, if it is occupied with a long data communication to the first device. To prevent the third device from being blocked in its communication to the second device, the second device is enabled to abort the data transmission between the first and the second device. The interruption of a current transmission can be executed by an ABORT packet. The ABORT packet can contain a specific address and sender of a certain device to prevent that ABORT packets of uncertain origin may interrupt a current transmission.

Preferably, the prioritizing of each link comprises the monitoring and adapting of the values of a current slot number ($N_{slot}$), an amount of slots ($N_{contact\_timeout}$) after which a contact event is considered to be finished, and a next possible contact timestamp ($N_{next\_contact}$).

The value of the role distinguishes in the simplest way between master M and slave S. The role primarily defines the direction of a communication link in which orders are transferred. It is a first level prioritization between two network devices. The network is a slotted network which means that transmissions are time discrete. A slot may be as long as a transfer unit in a time division duplex (TDD) transfer mode. Especially in combination with other transfer modes using frequency-hopping algorithms, a slot can be as long as the time the algorithm uses a single frequency. To be able to define a certain slot in which a data transfer can be executed the slots are numbered. This number is the slot number $N_{slot}$. The master and the slave have to agree upon the actual value of $N_{slot}$ to enable both systems to communicate with each other. Some slots can be used to start communication, wherein such a slot is called contact slot $N_{contact}$. By using contact slots, single master slave device pairs can define a discrete point time in which a contact can be started. Both devices need to use the same algorithm to calculate the next $N_{contact}$. It is not sufficient to transfer a $N_{next\_contact}$ at each $N_{contact}$, because if in one $N_{contact}$ the transmission of the location of the next $N_{contact}$ fails, the system has no chance to recover. So the system needs an algorithm, in which the $N_{next\_contact}$ can be calculated. Each communication link may have its own contact slots and method of calculating contact slots. Contact slots of different communication links may even be completely unrelated. Thus, it may happen that contact slots of different communication links overlap each other.

Master and slave device of a particular communication link must have a high probability of determining the same next contact slot for the communication link. This way, it is guaranteed that master and slave may initiate a contact event if both devices want to communicate with each other. Particular care must be taken when using the proposed backoff mechanism. This mechanism must be chosen adequately to allow two devices to meet after some bounded time.

A simple method to determine contact slots is to place them equidistantly into the predefined slotting. For this, the two parameters $N_{inter\_contact}$ and $0 \leq N_{contact\_offset} < N_{inter\_contact}$ are defined. The first parameter defines the distance between two contact slots, the second parameter defines the relative placement within the slotting. The slot with the slot number $N_{slot}$ is a contact slot, if: $N_{slot} \mod N_{inter\_contact} = N_{contact\_offset}$. If $N_{next\_contact}$ has to be found, the smallest slot number after the current slot number fulfilling the equations above is taken. The simplest case for regular placement is obtained by setting $N_{inter\_contact}$ to 1 and $N_{contact\_offset}$ to 0.

Additionally, both devices can store data related to the estimated length of the transmission. Therefore both network devices will know how long the actual transmission will last. In each slot a packet containing data or other information can be transferred. Longer packets that use more than a single slot are possible. As mentioned above, three different types of packet have to be distinguished. First, there is an ordinary data packet that may carry additional control information. Second, there is a dataless so-called NULL packet that is sent by a device that has no data to send. Third, there is a so-called ABORT packet that does not carry any data but provides a boolean flag (redistribute flag). The ABORT packet may be used at the end of contact events.

After a contact event has been established between two devices by using the same contact slot on both sides of their communication link, the two devices continue to exchange data until the contact event ends. Both devices may decide to end the current contact event at any time.

While peer devices A and B are in a contact event on a communication link, device A may decide to end the current contact event and start one with another device without notifying device B. As device B does not notice the other device leaving, it will end the contact event after a timeout, i.e. when the current slot number $N_{slot}$ exceeds $N_{last\_contact}$ by the threshold $N_{contact\_timeout}$. An implicit end of a contact event may trigger a redistribution of slots.

There are three possibilities for an explicit end of a contact event. First is a reception of an ABORT control packet. A device that ends a contact event may send the ABORT control packet to notify its peer. Thus, a device that receives an ABORT packet immediately regards the current contact event as finished. A redistribution of slots may be started on the receiving device, depending on the status of the redistribute control flag of the ABORT packet. Second is a double NULL sequence. If the queues of both devices of a communication link become empty, the devices will transmit NULL packets. Thus, after the slave answers a master's NULL packet with a NULL packet, both devices immediately regard the current contact event as finished. In case of double NULL sequence a redistribution of slots may be triggered on both devices. Third is a start of another contact event with higher priority A device may also end the current contact event because it uses a contact slot of another communication link in the next slot. The peer device of the communication link will notice the end of the contact event either explicitly (if an ABORT packet is sent to the peer device) or implicitly (if no such packet is sent).

Conveniently the method of prioritizing the slotted links in a network further comprises a step of storing a number of slots ($N_{max\_poll}$) after which the priority to contact the peer device is increased and a last contact timestamp ($N_{last\_contact}$). By the values of $N_{slot}$ and $N_{last\_contact}$ the device can count or calculate the time since the last successful contact. A device with low priority and low data transfer rates is always endangered to lose contact with the network, or that the network 'forgets' a link or a device. To prevent this, the priority of a network device is increased if too much time has passed since the last successful contact. Since there were no transmissions, both master and slave have to use the same algorithm to increase the priority of the link. The priority can be increased stepwise or be set to a maximum, if $N_{max\_poll}$ was reached.

Preferably, the adaptation of the priorities includes an adaptation of a slot account(s) and of a slot account threshold (min_serve). Slot accounting is usually performed at the beginning of each slot. If several different definitions of slot timing are present on one device, one is chosen as the reference timing. Slot accounting is done at the beginning of each slot in the reference timing. However, this timing is not necessarily used to send or receive the last packet. Therefore, at each beginning of a slot of a communication link where a packet is currently sent or received, the communication link is tagged. At the beginning of each reference slot, the tagged communication link is accounted for the last send/receive slot, i.e. its slot account is decremented by one. The tag is removed after accounting.

Most preferred is a method to achieve a fair distribution of communication time by scheduling contact events and redistributing slots using slot accounts. Thereby a redistribution of slot account values is readily obtained.

Preferably, the method of prioritizing the usage of slotted links in a network comprises the step that the slot account(s) is (are) extended with an unused slot account (us). It may happen that no device is tagged at accounting time. In this case, the unused slot account (us) is accounted. At the beginning of each slot, the slot account of one communication link in each device is increased by one. However, if the account for unused slots us is below zero, this account has to be increased by one and no other account is increased.

Accounts should be increased proportionally to the desired share that a communication link should get out of the overall amount of slots. In the most simple case, where all communication links are treated equally, all accounts get an equal share of the slots (in the long run). An approach to achieve this is to perform the increase of the accounts in a round robin fashion.

If anything was sent or received during the last slot, one decreases the slot account of the communication link that was used for the transfer. If nothing was sent or received during the last slot, the unused slot account us is decreased by one. Consequently, in each device, the sum of the unused slot account and of all slot accounts for communication links is always 0 after the increase and decrease operations at the beginning of a slot have been performed. Peer devices that used more than their assigned share of slots in the past will have negative slot accounts and peer devices that did not use up their assigned share of slots in the past will have positive slot accounts. It is desired to limit the maximum and minimum values of slot accounts in order to limit the amount of unfairness the algorithm compensates for. If a slot account reaches its maximum value it must not be elected for incrementation at the beginning of a slot. Instead of decrementing a slot account that has reached its minimum value, the unused slot account us should be decremented. In order to allocate slots to communication links in a fair manner, the proposed scheduling mechanism tries to balance the slot accounts by scheduling contact events appropriately and by redistributing slots.

Generally, a redistribution of slots takes a certain amount of slots from the slot account of the current communication link and distributes it among the other communication links. In the simplest case, where all devices are treated equally, the slots are distributed evenly among the other communication links. Of course, the sum of all slot accounts and us remains zero. The amount of slots to distribute can be computed in various ways. One option is to distribute all the positive slot account values (i.e. after the redistribution the slot account is zero). Another way would be to distribute slots in such a way that the value of the current communication link's account equals that of the lowest slot account after evenly distributing slots among the remaining communication links. In this case, the amount of slots to distribute is given by $$(s_{current} - s_{min}) \cdot (n-1)/n,$$

where $s_{current}$ is the value of the current communication link's account, $s_{min}$ is the value of the lowest account and n is the number of communication links of the device. Note that only credits are distributed, if $s_{current} > s_{min}$.

Advantageously, the method of prioritizing the usage of slotted links in a network further comprises storing and adapting a value of a backoff counter (b), which is related to the distance between two contact slots $N_{contact}$. It may happen that a contact event ends immediately after a successful contact attempt because both devices do not have any data to send. As the two slots used for the contact attempt are effectively lost, it may be desirable to minimize the occurrence of this kind of event. Additionally, keeping the number of unsuccessful contact attempts low is crucial, because otherwise contact events are aborted needlessly.

Thus, it may be preferable to reduce the number of contact attempts on such communication links. To do so, a backoff counter is kept in each communication link. This counter is increased and decreased by and at certain events. Higher values of the backoff counter mean that contact slots happen less frequently. Note that the backoff counter is only valid for communication links whose $N_{slot}$ value has not exceeded $N_{last\_contact}$ by the value of $N_{max\_poll}$.

If the backoff counter b and equidistant placement of contact slots is implemented, $N_{slot}$ is a contact slot, if $$N_{slot} \bmod 2^b N_{inter\_contact} = N_{contact\_offset}$$

If a device performed an unsuccessful contact event for a communication link, the backoff counter of this communication link should be increased. Other definitions of backoff counter are possible.

Preferably, a computer program for prioritizing the usage of slotted links in a network is provided, which comprises program code means for performing all the steps of anyone of the preceding method claims when said program is run on a computer or a network device.

Preferably, a computer program product is provided comprising program code means stored on a computer readable medium for performing the method of any one of the preceding method claims when said program product is run on a computer or network device.

Advantageously, a network device is provided, which is capable of prioritizing the usage of slotted links in a network and comprises means for pre-setting a distribution of properties for using a link to predetermined values, means for monitoring the current link usage, and means for adapting the current link usage in accordance with the monitored usage. With this device it is possible to start the optimization with a predefined priority distribution. The start distribution can be always the same, e.g. stored in a ROM (read only memory), by the last used distribution, or may be varied in an optimization process to find an optimal start distribution for the optimization process.

Conveniently, the Network device comprises means for storing transmission related data. These data can comprise the value of a role, which determined if the device is slave or master to the respective link, the value of Slot number $N_{slot}$, the value of $N_{max\_poll}$, the value of $N_{inter\_contact}$, $N_{contact\ timeout}$ and $N_{contact\ offset}$ which form the base for the calculation of the values of $N_{next\_contact}$, $N_{last\_contact}$, the slot account s, the unused slot account us and the backoff counter b. Some of the calculated values have to be stored too.

Preferably, a network device further comprises storing means for incoming and outgoing data. Storing means can be data queues or other storage devices used in computers. The memory is an important part of the network device as it is not able to receive and transmit data at the same time. The handling of simple instantaneously executable commands does not need storage devices. Data transmission may take longer, and may be non-interruptible. As transmissions may occupy multiple slots, it is sometimes necessary to interrupt an ongoing transmission to attend to a contact slot. This may happen on the receiving as well as on the sending side. There may be situations where transmissions cannot be interrupted. In order to cope with this constraint, the use of contact slots has to be planned beforehand. Of course, the number of slots planned to be looked at into the future depends on the maximum length of a transmission (counted in slots). In addition to that, it may be necessary to restrict the length of transmissions of the peer device (e.g. by attaching respective control data to ordinary data packets). A storing means must be provided in case the device operates in a non-slot synchronized way, as is the case with a printer in which the data receiving rate is much higher than the printing rate. In an external random access memory device, for example a separate data queue can be installed, such that the device may operate in a slot synchronized way, without time delay between the data access and the data transmission.

Advantageously, a network comprising network devices as claimed in previous network claims is provided. Such an 'all wireless' network is highly flexible and self organizing in its structure. With a range of approximately 10 m in buildings and an estimated office volume of about 40 m³ up to 30 other offices may be in the range of one network device. With the estimation of up to 7 network devices, up to 200 devices may be in the accessible range of one single wireless network device. Therefore, the transfer between these network devices is optimized.

Additionally, in a scatternet, a special prevention and surveillance of the scatternet has to be performed to prevent industrial espionage. Therefore each scatternet device may comprise authentication and encryption to ensure that all devices participating in the scatternet are allowed to do so. This may however complicate direct access to the scatternet. Scatternets even having a range of 10 to 100 m may be intercepted from greater distances by the use of directional aerials. As one option to create an authentication, a SIM (Subscriber Identification Module) may be used to ensure system access, wherein a user may only get access to the net, if a removable SIM is inserted into his personal device as an electronic key. The SIM concept may be used to define a global graduated master/slave concept.

Preferably, modified ordinary data communication packets are used for containing the timing control information, especially scheduling information corresponding to the scheduling method of the network using prioritized slotted links. Due to the algorithm used for performing the prioritizing of the slotted communication links time control information may be time-critical. The usage of modified ordinary data packets used for transmitting device data may ensure the up-to-date transmitting and receiving of the timing control information by the respective network devices.

Additionally, the time-critical timing control information may be transmitted using a dedicated or virtual network address only in case of an established network using prioritization of slotted communication links. In case of no established scatternet the separate network link due to the dedicated network address is not established.

Further additionally, if the timing control information is indicated by using a signalizing separate code sequence contained in the header portion of the data sequence, network devices consider the use of the timing control information only in case of an established network using prioritization of slotted communication links.

Preferably, the network using slotted communication links may be a wireless Bluetooth network using slotted communication links. The timing control information may be contained by modified baseband packets used for transmitting data of Bluetooth network devices. The specification of Bluetooth comprises data packets for transmitting link-specific control information. These messages are transmitted using the link manager protocol (LMP). LMP messages are for example used to establish the scatternet mode of a Bluetooth network which may be characterized by the usage of prioritized slotted communication links. Further LMP messages may also establish other network operating modes, like low-power modes, sniff mode, park mode, hold mode and further modes. A significant drawback with respect to time control information, especially scheduling control information, is found in the LMP receive timeout parameter which is specified to a default value of 30 seconds. Since timing control information may be time-critical, LMP messages are not suitable for transmitting thereof. The LMP is considered as not being appropriate for transmitting time-critical information and hence a successful adaptation it not possible. The variation of the default timeout value is not possible since LMP massages are used for negotiating communication state modes and certain modes, for example park mode and/or hold mode, require such a large timeout period for negotiation. Therefore, modified baseband packets may be used for transmitting the timing control information in an appropriate period of time.

Conveniently, the timing control information may be transmitted using a dedicated or virtual device address. Each active network device in a Bluetooth network has assigned an active member address (AM_ADDR). Each baseband packet contains an active member address in the header portion to address the respective receiving network device. In order to establish a quasi-separate communication link an additional dedicated active member address is assigned to the network device to transmit the timing control information. The additional dedicated active member address may lead to the establishing of an additional communication link independently to the current existing communication links. Moreover, the additional established communication link is independent from the network load transmitted through the current existing communication links. This method enables the transmission of the timing control information just-in-time.

Advantageously, the network device may recognize the modified baseband packets by the usage of the dedicated active member address and uses accordingly the timing control information.

Preferably, the additional communication link is established in case of the operation of the Bluetooth network using scatternet mode. More preferably, the additional communication link is established in case of the operation of the Bluetooth network using prioritized slotted communication links like those described above.

Conveniently, the header portion of the baseband packet used for transmitting the time-critical timing control information contains a signalizing bit indicating that the baseband packet contains the timing control information.

Preferably, the modified baseband packet containing the timing control information contains a signalizing code sequence in the header portion that also contains the active member address (AM_ADDR) of the receiving network device. The signalizing code sequence may be a signalizing bit, also referred to as a flag or a flag bit. This flag indicates that the payload of the modified baseband packet contains exclusively timing control information. According to the flag set to indicate the containing of the timing control information a quasi-separate logical channel may be established for transmitting the modified baseband packet.

Advantageously, the network device may recognize the modified baseband packets by signalizing bit and uses accordingly the timing control information.

Preferably, the additional communication links are established in case of the operation of the Bluetooth network using scatternet mode. More preferably, the additional communication link is established in case of the operation of the Bluetooth network using prioritized slotted communication links like those described above.

Bluetooth networks may be operated in different operation modes. These operation modes are distinguished by the connection state. The connection state defines the number of transmission slots assigned by a master network device to a slave network device available for network devices. According to the number of slots assigned to the slave network device available for transmitting and receiving, the different modes' connection states are distinguished. Timing control information may be transmitted during the different operation modes via the link manager protocol (LMP) as link manager protocol (LMP) messages. Referring to the above description, the LMP messages are transmitted to the network devices with a time-out period of 30 seconds. This time-out period may be not adequate to transmit important timing control information in-time.

Advantageously, modified baseband packets according to any one of the above described embodiments may be used to transmit timing control information, especially scheduling information, just-in-time during operation of the communication state in an active mode.

Preferably, modified baseband packets according to any one of the above described embodiments may be used to transmit timing control information, especially scheduling information, just-in-time during operation of the communication state in a sniff mode.

Preferably, a computer program for transmitting timing control information, especially scheduling information, in a network using slotted communication links by single network devices is provided, which comprises program code means for performing all the steps of any one of the preceding methods when said program is run on a computer or a network device.

Preferably, a computer program product is provided comprising program code means stored on a computer readable medium for performing the method of anyone of the preceding methods when said program product is run on a computer or network device.

BRIEF DESCRIPTION OF THE DRAWING

In the following, the invention will be described in detail by referring to the enclosed drawings in which:

FIG. 4 shows another network topology comprising devices and communication links.

FIG. 5 shows a node in a network according to a network using prioritized slotted communication links.

FIG. 6 shows a timing diagram of slot accounting with differing slot timings of network devices within a network using prioritized slotted communication links.

FIG. 7 shows the network topology of FIG. 1 with an uneven data traffic distribution.

BEST MODE FOR CARRYING OUT THE INVENTION

Figure 1:
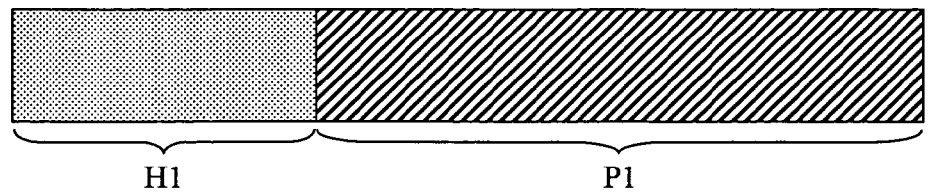
FIG. 1 shows a data sequence containing a header portion and a payload portion suitable for transmitting the timing control information according to an embodiment of the invention.

FIG. 1 shows a data sequence. The data sequence comprises a header portion H1 and a payload portion P1. The header portion H1 contains an address of a network devices. The payload portion P1 contains exclusively timing control information.

Figure 2:
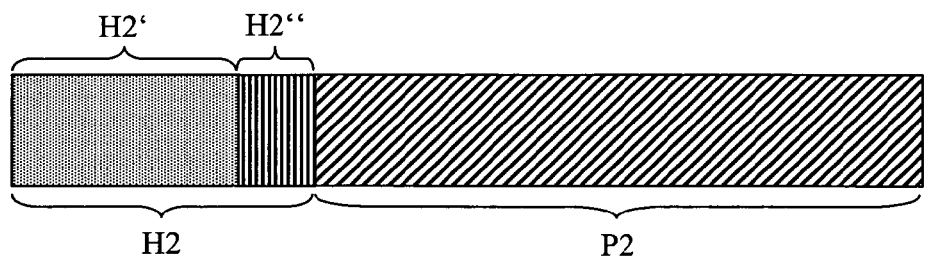
FIG. 2 shows a data sequence containing a header portion an a payload portion, wherein the header portion contains additional a code sequence to indicate the containing of the timing control information according to an embodiment of the invention.

FIG. 2 shows a data sequence. The data sequence comprises a header portion H2 and a payload portion P2. The header portion H2 contains an address H2' of a network device and an additional code sequence H2" to indicate that the payload portion contains exclusively timing control information.

Figure 3:
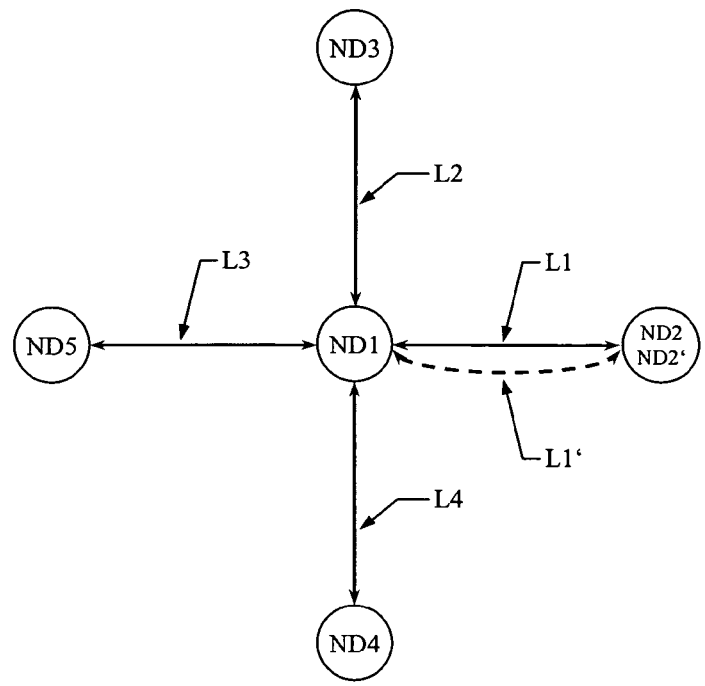
FIG. 3 shows a network topology comprising devices and communication links.

FIG. 3 shows a topology comprising device ND1-ND5 and communication links L1-L4 between devices ND1 and the devices ND2-ND5. The communication links L1-L4 may be established and used for device data transmission. The communication links may be assigned according to an algorithm prioritizing communication links corresponding to the method described above but may be also assigned according another algorithm. A packet containing timing control information may be transmitted from device ND1 to device ND2. In order to transmit the timing control information the device ND2 is addressed using a dedicated address addressing device ND2'. The devices ND2 and ND2' are physically the same network devices but logically different network devices. Therefore, an additional network communication link is established by device ND1 in order to transmit the packet containing timing control information to logical device ND2'. This communication link is referred as communication link L1' in FIG. 3. Thus, the packet containing timing control information is transmitted parallel to the current established communication links of the network devices and consequently independent of the network communication load and the current transmission priority of device ND2. The device ND2 may recognize the packet containing timing control information by the dedicated device address of the virtual device ND2' and uses the timing control information for further operation.

Similarly, packets containing timing control information indicated by signalizing code sequence may be transmitted using the established communication link L1. But it may also be possible to establish a corresponding communication link L1' by the device ND1 since the packet contains a signalizing code sequence indication containing timing control information. Accordingly, the receiving network device ND2 recognizes the packet containing timing control information by the signalizing code sequence and uses the timing control information for further operation.

FIG. 4 shows another topology comprising devices 1-6 and communication links between the devices 1-6 are given. Communication links are point-to-point and are used to exchange data or control packets between the two devices involved. One of the two devices participating in a communication link is the master M of the link while the other one is the slave S. The master M or the slave S role a device 1-6 adapts for a particular link is independent from the other communication links of the device 1-6. The master/slave role assignment for the connections of a topology is given beforehand. FIG. 4 shows an example of such a topology.

FIG. 5 shows a node in a network according to the present invention. A device 4 may only communicate over one communication link with one other device (only device 5 is shown in the drawing) at the time. In order to communicate over several links 43, 45, 46 a device must switch between communication links 43, 45, 46 using a time division multiplex scheme. Communication between two devices 4, 5 over a communication link 45 is only possible if both devices use the same communication link 45 at the same time.

If two devices 4, 5 communicate with each other over a communication link 45, the master device 4 of the communication link 45 determines the communication parameters (e.g. timing, slot numbers, frequencies, . . . partially shown in the box) and the slave device 5 adapts to these parameters. Devices use a slotted communication scheme. The master device 4 determines the slotting on the communication link 45. To simplify the description of the proposed prioritization method, it is assumed that the slots are aligned throughout the whole network. In order to identify the slots, the master device 4 assigns a slot number $N_{slot}$ to each slot. It is assumed that the slave device 5 knows the communication parameters of the master device 4 including the slot numbers $N_{slot}$. A slave device 5 is only allowed to send a packet if the master device 4 polls it. This may happen using a normal data packet, or using a control packet containing no data (a so-called NULL packet). The slave device 5 is required to respond to every master device 4 packet by sending any packet (with or without data). Packets that use more than a single slot are possible. The master of each link defines the communication parameters and the priority parameters (the values of M/S, $N_{inter\_contact}$, . . . ) of the links.

FIG. 6 shows a timing diagram of slot accounting with differing slot timings. Up to now, it was assumed that all devices in a network use the same slot definitions. In the following, we introduce the adaptations that have to be made to the proposed mechanisms in order to support differing slot definitions on each master. However, a slave in a communication link continues to know the slot definition of its master, as it has to follow the master's timing when communicating with the master. In general, two problems have to be solved. Firstly, management of the slot accounts has to be done for different slot timings. Secondly, when contact slots are used, the time shift between different communication links has to be taken into account. It was assumed that all slots throughout the whole network are synchronized, so slot accounting can be performed at the beginning of each slot. If several different definitions of slot timing are present on one device, one is chosen as the reference timing. Slot accounting is done at the beginning of each slot in the reference timing. However, this timing was not necessarily used to send or receive the last packet. Therefore, at each beginning of a slot of a communication link where a packet is currently sent or received, the communication link is tagged. At the beginning of each reference slot, the tagged communication link is accounted for the last send/receive slot, i.e. its slot account is decremented by one. The tag is removed after accounting. It may happen that no device is tagged at accounting time. In this case, the unused slot account us is accounted.

FIG. 7 shows the network topology of FIG. 1 with an uneven data traffic distribution. As in FIG. 1, network device 4 is master to the network devices 3, 5 and 6. The network device 3 is slave to device 4 and master to devices 1 and 2. Links are numbered in accordance with the enumeration of the devices they are connecting. The arrows on the links indicate the master/slave relation of the link, and therefore the first level of priority. In the example, two big data transfers are taking place. The first from device 1 to device 2 via device 3 and the links 31 and 32, which is abbreviated link 132. And abbreviated in the same manner a second data transfer on link 546 takes place. At the same time, there is no transmission on link 43. Therefore the distance between two contact slots is increased by the backoff counter and simultaneously the number of slots usable in sequence can be decreased by slot redistribution. Therefore, device 3 primarily transfers data from device 1 to device 2, temporarily checking link 43, preventing the waste of too much time on an unused link. Device 4 primarily transfers data from device 5 to device 6, temporarily checking link 43, preventing the waste of too much time on an unused link. And therefore, the values of $N_{ic}=2^b N_{inter\_contact}$ between two contact slots on the links 132 and 546 are set to minimum, so that both links nearly occupy the whole transmission time of the devices 3 and 4. On link 43, $N_{ic}$ increases till $N_{ic}$ exceeds $N_{max\_poll}$, then only $N_{max\_poll}$ is respected to prevent a 'wind up' effect.

This application contains the description of implementations and embodiments of the present invention with the help of examples. It will be appreciated by a person skilled in the art that the present invention is not restricted to details of the embodiments presented above, and that the invention can also be implemented in another form without deviating from the scope of the appending claims. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

The invention claimed is:

1. A device comprising:
a processor;
a non-transitory computer-readable medium including computer-executable instructions stored thereon that, if executed by the processor, cause the processor to:
define a data sequence, the data sequence including a header portion and a payload portion, wherein the header portion includes an address code of a second device and the payload portion includes timing control information for communicating packets between devices in a communication network wherein the timing control information defines when the second device communicates, wherein the address code is a first active member address of the second device, and wherein the first active member address and a second active member address are assigned to the second device; and
an antenna configured to transmit the defined data sequence in a data communication packet to the second device in a time defined contact slot.

2. The device of claim 1, wherein the payload portion includes only the timing control information.

3. The device of claim 1, wherein the address code indicates that the data communication packet contains the timing control information.

4. The device of claim 1, wherein the data sequence further includes a flag bit indicating that the data communication packet contains the timing control information.

5. A method of transmitting timing control information from a first device to a second device in a communication network, the method comprising:
defining a data sequence at a first device, the data sequence including a header portion and a payload portion, wherein the header portion includes an address code of a second device and the payload portion includes timing control information for communicating packets between devices in a communication network wherein the timing control information defines when the second device communicates, wherein the address code is a first active member address of the second device, and wherein the first active member address and a second active member address are assigned to the second device; and transmitting the defined data sequence in a data communication packet from the first device to the second device in a time defined contact slot.

6. The method of claim 5, further comprising:

identifying a current slot number at the first device;

determining a first value of a first parameter at the first device, the first parameter defining a distance between contact slots for communicating with the second device;

determining a second value of a second parameter at the first device, the second parameter defining an offset distance from a start of a contact slot for communicating with the second device;

determining a next contact slot for communicating with the second device, wherein the next contact slot is a smallest slot number after the identified current slot number that satisfies $N_{slot} \bmod N_{inter\_contact} = N_{contact\_offset}$ where $N_{slot}$ is the smallest slot number after the identified current slot number, $N_{inter\_contact}$ is the determined first value, and $N_{contact\_offset}$ is the determined second value.

7. The method of claim 6, further comprising determining a third value of a third parameter at the first device, the third parameter defining a backoff counter for communicating with the second device, wherein the next contact slot is determined based on $_{Nslot} \bmod 2^b\, N_{inter\_contact=Ncontact\_offset}$ where b is the determined third value.

8. The method of claim 7, further comprising adjusting the determined third value unless $2^b\, N_{inter\_contact} > N_{max\_poll}$ where $N_{max\_poll}$ is a maximum number of slots to allow since a last successful contact event.

9. The method of claim 5, wherein the timing control information comprises scheduling information associated with a scheduling method for prioritizing use of contact slots in the communication network.

10. The method of claim 5, wherein the payload portion includes only the timing control information.

11. The method of claim 5, wherein the data sequence further includes a flag bit indicating that the data communication packet contains the timing control information.

12. The method of claim 5, wherein the first active member address indicates that the data communication packet contains the timing control information.

13. The method of claim 5, wherein the data communication packet is transmitted using a first communication link to the second device, wherein the first communication link is parallel to a second communication link to the second device.

14. A non-transitory computer-readable medium having computer-executable instructions stored thereon that, if executed by a processor, cause a computing device to:

define a data sequence, the data sequence including a header portion and a payload portion, wherein the header portion includes an address code of a second device and the payload portion includes timing control information for transmitting packets in a communication network wherein the timing control information defines when the second device communicates, wherein the address code is a first active member address of the second device, and wherein the first active member address and a second active member address are assigned to the second device; and transmit the defined data sequence in a data communication packet to the second device in a time defined contact slot.

15. The non-transitory computer-readable medium of claim 14, wherein the payload portion includes only the timing control information.

16. The non-transitory computer-readable medium of claim 14, wherein the address code indicates that the data communication packet contains the timing control information.

17. The non-transitory computer-readable medium of claim 14, wherein the data sequence further includes a flag bit indicating that the data communication packet contains the timing control information.

18. A device comprising:

an antenna configured to receive a data communication packet from a first device;

a processor;

a non-transitory computer-readable medium including computer-executable instructions stored thereon that, if executed by the processor, cause the processor to:

identify a data sequence from the received data communication packet, wherein the data sequence includes a header portion and a payload portion, wherein the header portion includes an address code of the device and the payload portion includes timing control information for communicating packets between devices wherein the timing control information defines when the device communicates, wherein the address code is a first active member address of the device, and wherein the first active member address and a second active member address are assigned to the device; and determine that the identified data sequence includes the timing control information.

19. The device of claim 18, wherein the payload portion includes only the timing control information.

20. The device of claim 18, wherein the determination is based on the address code.

21. The device of claim 18, wherein the data sequence further includes a flag bit and the determination is based on the value of the flag bit.

22. A method of receiving timing control information from a first device at a second device in a communication network, the method comprising:

receiving a data communication packet from a first device at a second device;

identifying a data sequence from the received data communication packet, wherein the data sequence includes a header portion and a payload portion, wherein the header portion includes an address code of the second device and the payload portion includes timing control information for communicating packets between devices wherein the timing control information defines when the second device communicates, wherein the address code is a first active member address of the second device, and wherein the first active member address and a second active member address are assigned to the second device; and determining that the identified data sequence includes the timing control information.

23. The method of claim 22, wherein the payload portion includes only the timing control information.

24. The method of claim 22, wherein the determination is based on the address code.

25. The method of claim 22, wherein the data sequence further includes a flag bit and the determination is based on the value of the flag bit.

26. A non-transitory computer-readable medium having computer-executable instructions stored thereon that, if executed by a processor, cause a computing device to:

receive a data communication packet from a first device;

identify a data sequence from the received data communication packet, wherein the data sequence includes a header portion and a payload portion, wherein the header portion includes an address code of the computing device and the payload portion includes timing control information for communicating packets between devices wherein the timing control information defines when the computing device communicates, wherein the address code is a first active member address of the computing device, and wherein the first active member address and a second active member address are assigned to the computing device; and determine that the identified data sequence includes the timing control information.

27. The non-transitory computer-readable medium of claim 26, wherein the payload portion includes only the timing control information.

28. The non-transitory computer-readable medium of claim 26, wherein the determination is based on the address code.

29. The non-transitory computer-readable medium of claim 26, wherein the data sequence further includes a flag bit and the determination is based on the value of the flag bit.

* * * * *

UNITED STATES PATENT AND TRADEMARK OFFICE
CERTIFICATE OF CORRECTION

PATENT NO. : 7,974,260 B2  
APPLICATION NO. : 10/489269  
DATED : July 5, 2011  
INVENTOR(S) : Kuhl et al.

Page 1 of 1

It is certified that error appears in the above-identified patent and that said Letters Patent is hereby corrected as shown below:

Title Page 2, item (56), under "Other Publications", in Column 2, Line 4, delete "polices" and insert -- policies --.

Column 19, line 28, in Claim 7, delete "$N_{slot} \bmod 2^h \ N_{inter...contact=Ncontact...offset}$" and insert -- $N_{slot} \bmod 2^b N_{inter...contact} = N_{contact...offset}$ --.

Signed and Sealed this  
Twenty-ninth Day of November, 2011

David J. Kappos  
*Director of the United States Patent and Trademark Office*